(12) United States Patent
Kim et al.

(10) Patent No.: US 9,274,356 B2
(45) Date of Patent: Mar. 1, 2016

(54) PARALLAX BARRIER TYPE STEREOSCOPIC IMAGE DISPLAY DEVICE

(71) Applicant: LG Display Co., Ltd., Seoul (KR)

(72) Inventors: Hojae Kim, Gyeongsan-si (KR); Jonghyuck Lee, Gumi-si (KR); Doheon Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 197 days.

(21) Appl. No.: 13/726,883

(22) Filed: Dec. 26, 2012

(65) Prior Publication Data

US 2013/0342586 A1     Dec. 26, 2013

(30) Foreign Application Priority Data

Jun. 22, 2012  (KR) ........................ 10-2012-0067567

(51) Int. Cl.
| | |
|---|---|
| G02F 1/13 | (2006.01) |
| G02B 27/22 | (2006.01) |
| H04N 13/04 | (2006.01) |
| G02B 27/00 | (2006.01) |

(52) U.S. Cl.
CPC .......... *G02F 1/1313* (2013.01); *G02B 27/0093* (2013.01); *G02B 27/2214* (2013.01); *H04N 13/0409* (2013.01); *H04N 13/0468* (2013.01)

(58) Field of Classification Search
CPC .......... H04N 13/0409; H04N 13/0413; H04N 13/0411; H04N 13/0497; H04N 13/04; H04N 13/0468; G09G 2320/0209; G09G 2320/028; G02F 1/1347; G02F 1/13; G02F 1/139; G02F 1/1335; G02F 1/1333; G02F 1/1313; G02B 27/2214; G02B 27/22; G02B 27/0093

USPC ........................................................... 345/690
See application file for complete search history.

(56) References Cited

U.S. PATENT DOCUMENTS

| | | | | |
|---|---|---|---|---|
| 8,045,070 | B2 * | 10/2011 | Park .................. | G02F 1/133512 349/110 |
| 8,305,551 | B2 * | 11/2012 | Son .............................. | 349/200 |
| 8,462,280 | B2 * | 6/2013 | Kim ................................ | 349/33 |
| 8,502,930 | B2 * | 8/2013 | Im .................................. | 349/15 |
| 8,605,227 | B2 * | 12/2013 | Yoon et al. ....................... | 349/15 |

(Continued)

FOREIGN PATENT DOCUMENTS

| | | |
|---|---|---|
| KR | 20100009739 A * | 1/2010 |
| KR | 10-2013-0036876 A | 4/2013 |

OTHER PUBLICATIONS

Korean Intellectual Property Office, Office Action, Korean Patent Application No. 10-2012-0067567, Mar. 31, 2014, five pages [with concise explanation of relevancy in English].

*Primary Examiner* — Temesgh Ghebretinsae
*Assistant Examiner* — Michael J Jansen, II
(74) *Attorney, Agent, or Firm* — Fenwick & West LLP

(57) ABSTRACT

A parallax barrier type stereoscopic image display device comprises: an image panel that display a left-eye image and a right-eye image; a barrier panel that has a switchable barrier comprising a liquid crystal layer, a reference electrode positioned above the liquid crystal layer, and a plurality of driving electrode channels positioned below the liquid crystal layer, each of which is controlled independently, and selectively blocks light from the image panel; and a driver that supplies a reference voltage to the reference electrode and applies a channel driving voltage to the driving electrode channels to form a barrier area and an open area in the switchable barrier.

4 Claims, 15 Drawing Sheets

(56) References Cited

U.S. PATENT DOCUMENTS

| | | | | |
|---|---|---|---|---|
| 8,610,838 B2* | 12/2013 | Kim et al. | | 349/15 |
| 8,675,148 B2* | 3/2014 | Takagi | G02B 27/2214 | 349/139 |
| 9,036,101 B2* | 5/2015 | Takagi | G02B 27/2214 | 349/139 |
| 2007/0183015 A1* | 8/2007 | Jacobs et al. | | 359/245 |
| 2008/0204871 A1* | 8/2008 | Mather et al. | | 359/462 |
| 2008/0218459 A1* | 9/2008 | Kim et al. | | 345/87 |
| 2009/0002267 A1* | 1/2009 | Nam | G02B 27/2214 | 345/6 |
| 2009/0040426 A1* | 2/2009 | Mather et al. | | 349/65 |
| 2009/0225243 A1* | 9/2009 | Kim | G02B 27/2214 | 349/15 |
| 2010/0110316 A1* | 5/2010 | Huang et al. | | 349/15 |
| 2011/0157171 A1* | 6/2011 | Lin | | 345/419 |
| 2011/0157496 A1* | 6/2011 | Im | | 349/15 |
| 2011/0157497 A1* | 6/2011 | Kim | G02B 27/2214 | 349/15 |
| 2011/0157499 A1* | 6/2011 | Lee | G02B 3/08 | 349/15 |
| 2011/0170026 A1* | 7/2011 | Lin | | 349/15 |
| 2011/0242442 A1* | 10/2011 | Lee et al. | | 349/15 |
| 2012/0001890 A1* | 1/2012 | Kook | G02B 27/2214 | 345/212 |
| 2012/0105750 A1* | 5/2012 | Yoon et al. | | 349/15 |
| 2012/0154556 A1* | 6/2012 | An et al. | | 348/51 |
| 2012/0162550 A1* | 6/2012 | Jeong et al. | | 349/15 |
| 2013/0009859 A1* | 1/2013 | Woo et al. | | 345/156 |
| 2013/0127831 A1* | 5/2013 | Kim et al. | | 345/419 |
| 2013/0148070 A1* | 6/2013 | Kim | G02F 1/134327 | 349/143 |
| 2013/0215368 A1* | 8/2013 | Takagi | G02B 27/22 | 349/138 |
| 2013/0229587 A1* | 9/2013 | Takama | G02B 27/22 | 349/33 |
| 2013/0329174 A1* | 12/2013 | Kanbayashi et al. | | 349/127 |
| 2014/0063209 A1* | 3/2014 | Watanabe | H04N 13/0409 | 348/51 |
| 2014/0168548 A1* | 6/2014 | Murao | H04N 13/0409 | 349/15 |
| 2014/0168549 A1* | 6/2014 | Murao | G02F 1/134309 | 349/15 |
| 2014/0176841 A1* | 6/2014 | Takagi | G02B 27/2214 | 349/33 |
| 2014/0184962 A1* | 7/2014 | Murao | G02B 27/2214 | 349/15 |

* cited by examiner

Stripe pattern is visible

PARALLAX BARRIER TYPE STEREOSCOPIC IMAGE DISPLAY DEVICE

CROSS-REFERENCE TO RELATED APPLICATIONS

This application claims the benefit of Korean Patent Application No. 10-2012-0067567 filed on Jun. 22, 2012, which is incorporated herein by reference for all purposes as if fully set forth herein.

BACKGROUND

1. Field

This document relates to a parallax type stereoscopic image display device.

2. Related Art

Recently, with the increasing interest in three-dimensional stereoscopic images, there have been developed a variety of stereoscopic image display devices. Generally, a stereoscopic sense that a person perceives occurs from a complex effect of the degree of a change of thickness of the person's eye lens according to the location of an object to be observed, the angle difference of the object observed from both eyes, the differences of location and shape of the object observed from both eyes, the time difference due to a movement of the object, and other various psychological and memory effects. In particular, binocular disparity, caused by about a 6-7 cm lateral distance between the person's left eye and right eye, can be regarded as the main cause of the stereoscopic sense. Due to binocular disparity, the person perceives the object with an angle difference, which makes the left eye and the right eye receive different images, and when these two images are transmitted to the person's brain through retinas, the brain can perceive the original three-dimensional stereoscopic image by combining the two pieces of information.

Methods for displaying stereoscopic images using binocular disparity are classified into a glasses method and a non-glasses method. A glasses type stereoscopic image display device displays left and right parallax images each having a different polarization direction on a display panel, and displays a 3D image using polarization glasses or liquid crystal shutter glasses. On the other hand, a non-glasses type stereoscopic image display device includes a parallax barrier and a lenticular lens. Recently, research into these types of stereoscopic image display devices is actively under way.

As shown in FIG. 1, the parallax type stereoscopic image display spatially separates light incident from an image panel into light of a left-eye image and light of a right-eye image by using a barrier panel. The barrier panel and the image panel may be integrated into a display element. The barrier panel has a switchable barrier for selectively blocking the light incident from the image panel. As shown in FIG. 2, the switchable barrier panel comprises a liquid crystal layer LC and a first electrode pattern E1 and a second electrode pattern E2 which are formed to face each other, with the liquid crystal layer LC interposed therebetween. A driving voltage is applied to the first electrode pattern E1 to drive the liquid crystal layer LC, and a reference voltage is applied to the second electrode pattern E2. In the switchable barrier panel, when the liquid crystal layer LC is driven to block light by the driving voltage applied to the first electrode pattern E1, the liquid crystal layer LC functions as a barrier area, and when the liquid crystal layer LC is driven to cause light to pass therethrough, the liquid crystal layer LC functions as an open area.

In such a switchable barrier, the open area and the barrier area are fixed to the sizes given at design time. The size ratio between the open area and the barrier area is set to a constant value by taking viewing distance, viewing angle, etc. into account. In the parallax barrier type stereoscopic image display device, accordingly, the display quality of a 3D image varies according to viewing distance, and the viewing angle is very limited. Moreover, the concept of multi-view was introduced into the conventional parallax barrier type stereoscopic image display device to secure a viewing angle. In this case, degradation in the picture quality of stereoscopic images caused by resolution degradation is unavoidable.

Recently, a dynamic barrier technology has been introduced into the parallax barrier type stereoscopic image display device in order to compensate for viewing angle limitations and resolution degradation. The dynamic barrier technology, used in conjunction with an eye-tracking technology, is a method for compensating for a viewing angle by changing the position of the barrier as the viewer's eyes are diverted. In the dynamic barrier technology, for example, the position of the barrier is changed to the right by $\Delta X$ as shown in FIG. 3 as much as the position of the viewer's both eyes (left and right eyes) is shifted to the right from the first point P1 to the second point P2, thus securing a viewing angle enough not to cause 3D crosstalk.

To implement this dynamic barrier technology, the first electrode pattern ('E1' of FIG. 2) applied with the liquid crystal driving voltage needs to be finely controlled. To this end, it is inevitable to apply multiple layers (two or three layers) for multichannel configuration to the first electrode pattern. However, multilayer application may be accompanied by a luminance difference which occurs within the barrier, thereby degrading the quality of a stereoscopic image and causing visual fatigue. The main reasons for luminance difference include etch bias difference between layers, difference in effective dielectric constant, alignment tolerance, etc.

SUMMARY

Accordingly, it is an object of the present invention to provide a parallax barrier type stereoscopic image display device which compensates for luminance difference in a barrier when employing a dynamic barrier technology based on multi-channels comprising driving electrode channels formed in multiple layers.

To accomplish the above aspect, according to an exemplary embodiment of the present invention, there is provided a parallax barrier type stereoscopic image display device comprising: an image panel that display a left-eye image and a right-eye image; a barrier panel that has a switchable barrier comprising a liquid crystal layer, a reference electrode positioned above the liquid crystal layer, and a plurality of driving electrode channels positioned below the liquid crystal layer, each of which is controlled independently, and selectively blocks light from the image panel; and a driver that supplies a reference voltage to the reference electrode and applies a channel driving voltage to the driving electrode channels to form a barrier area and an open area in the switchable barrier, the driving electrode channels comprising a first channel group of a first layer spaced a first distance apart from the reference electrode and a second channel group of a second layer spaced a second distance apart from the reference electrode, the second distance being greater than the first distance, wherein a first channel driving voltage applied to the first channel group to form the barrier area and a second channel driving voltage applied to the second channel group to form the barrier area are different.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, an exemplary embodiment of the present invention will be described with reference to FIGS. 4 to 17.

Figure 1:
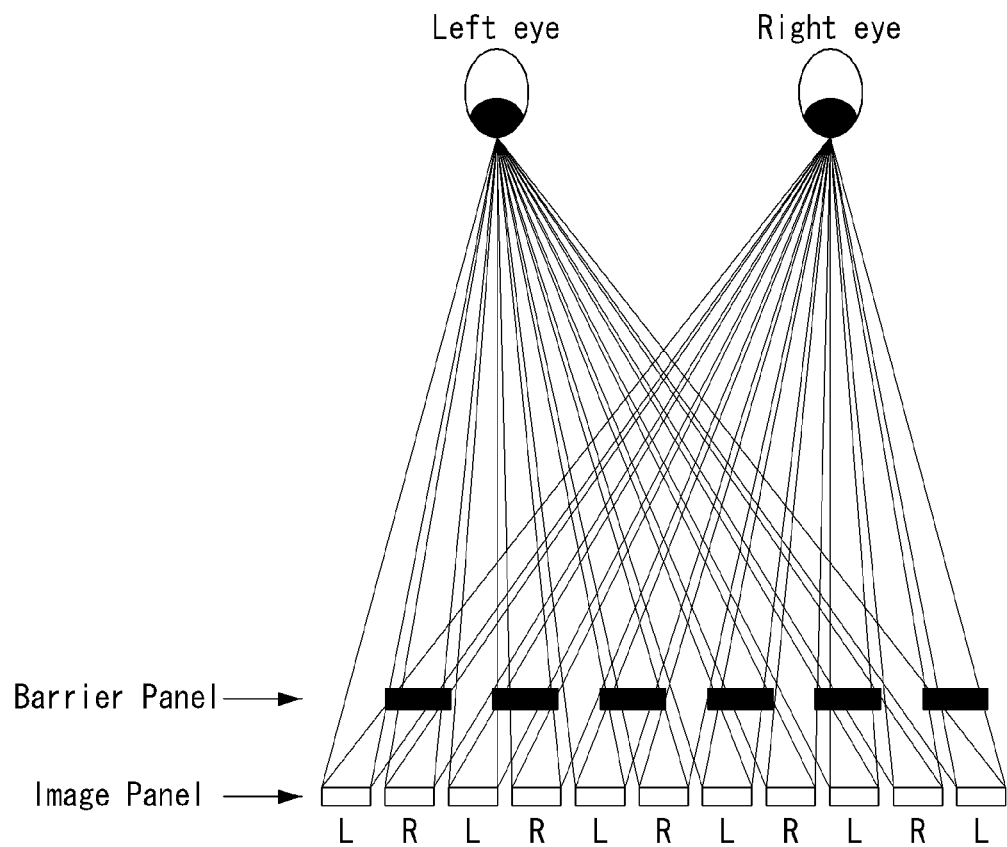
FIG. 1 is a view schematically showing a conventional parallax barrier type stereoscopic image display device.
Figure 2:
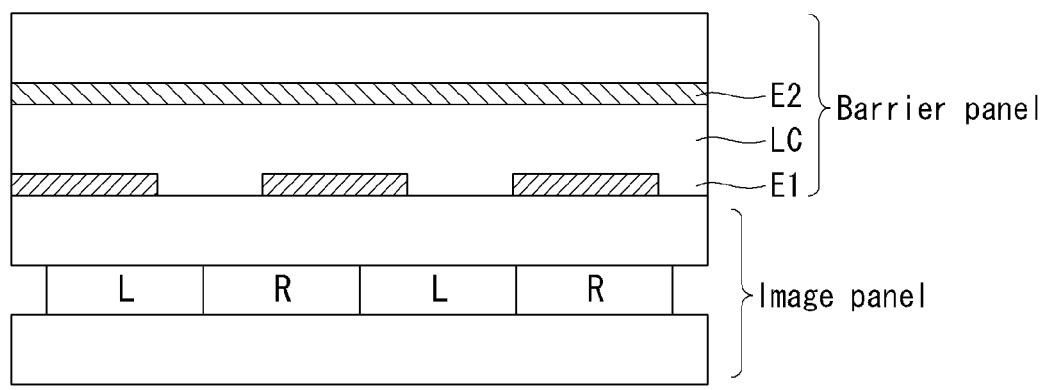
FIG. 2 is a view schematically showing a barrier panel and an image panel which comprise a parallax barrier type stereoscopic image display device.
Figure 3:
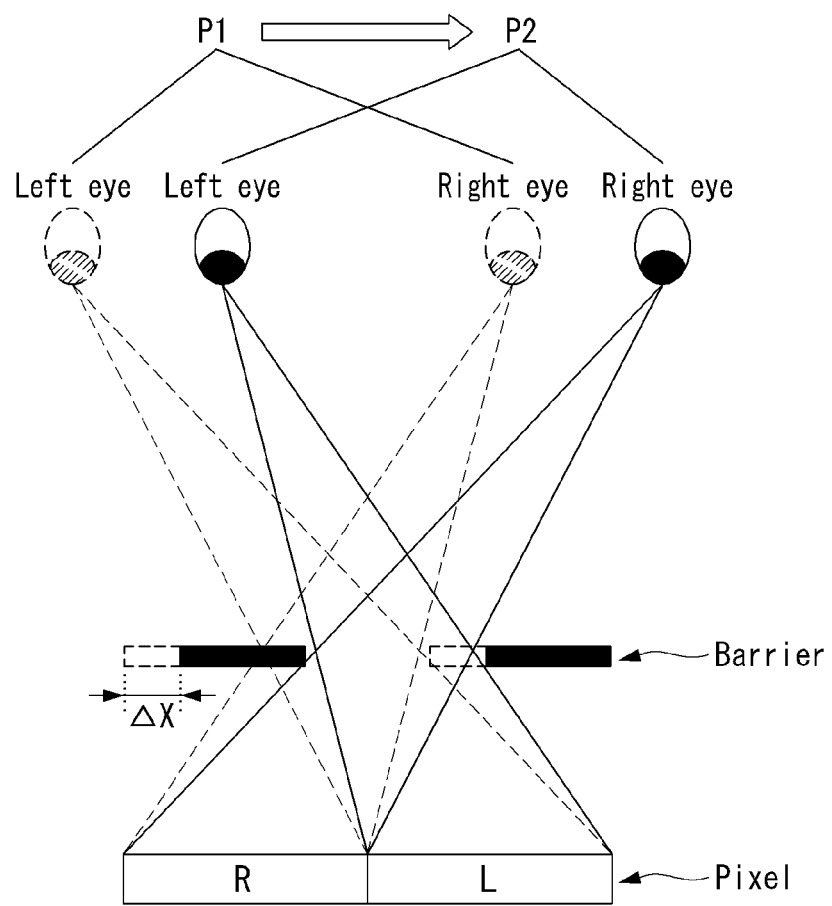
FIG. 3 is a view for explaining a dynamic barrier technology introduced into the parallax barrier type stereoscopic image display device.
Figure 4:
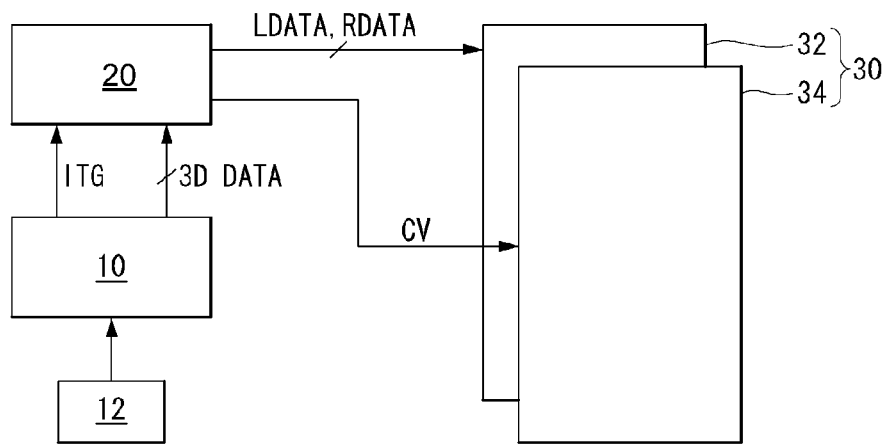
FIG. 4 is a view showing a parallax barrier type stereoscopic image display device according to an exemplary embodiment of the present invention.
Figure 5:
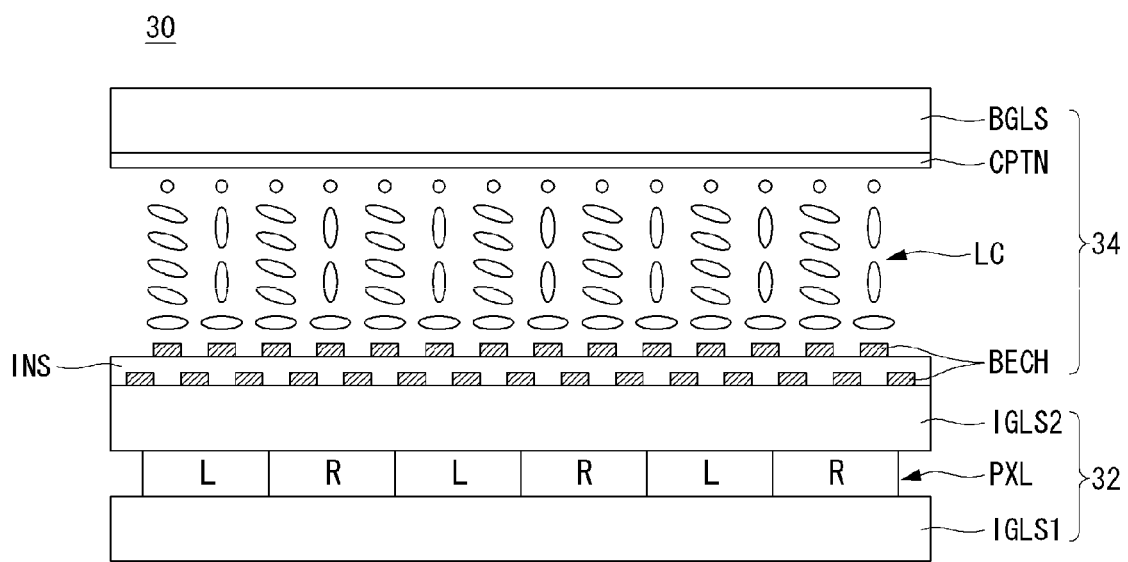
FIG. 5 is a cross-sectional view showing a display element of FIG. 4.

FIG. 4 is a view showing a parallax barrier type stereoscopic image display device according to an exemplary embodiment of the present invention. FIG. 5 is a cross-sectional view showing a display element of FIG. 4.

Referring to FIG. 4, the stereoscopic image display device according to the exemplary embodiment of the present invention comprises a controller 10, a driver 20, and a display element 30.

The display element 30 comprises an image panel 32 and a barrier panel 34. The display element 30 spatially separates light incident from the image panel 32 into light of a left-eye image and light of a right-eye image by using the barrier panel 34. The barrier panel 34 guides the light of the left-eye image only to the viewer's left eye and the light of the right-eye image only to the viewer's right eye, thereby displaying a 3D image.

The image panel 32 may be implemented as a liquid crystal display panel, an electric field emission display panel, a plasma display panel, an organic light emitting diode display panel, an electrophoretic display panel, etc.

When implementing the image panel 32 as the organic light emitting diode display panel, the image panel 32 comprises a plurality of pixels PXL formed between a first image substrate IGLS1 and a second image substrate IGLS2 shown in FIG. 5. The pixels PXL are formed at crossings of a plurality of gate lines and a plurality of data lines and display a left-eye image L and a right-eye image R in an alternating manner. Each of the pixels PXL may comprise an organic light emitting diode, which is a self-luminous element, a driving TFT (thin film transistor), at least one switching TFT, a storage capacitor, etc. The organic light emitting diode comprises an organic compound layer formed between an anode and a cathode. The organic compound layer comprises a hole injection layer HIL, a hole transport layer HTL, an emission layer EML, an electron transport layer ETL, and an electron injection layer EIL. When a voltage is applied to the anode and the cathode, holes which have passed the hole transport layer (HTL) and electrons which have passed the electron transport layer (ETL) move to the emission layer (EML) and form excitons; and as a result, the emission layer (EML) generates visible light. The driving TFT controls a driving current flowing in the organic light emitting diode in accordance with its gate-source voltage. The switching TFT programs a voltage applied to a gate node of the driving TFT. The storage capacitor keeps the voltage applied to the gate node of the driving TFT constant.

The barrier panel 34 may be integral with the image panel 32. As show in FIG. 5, the barrier panel 34 may be formed directly on the image panel 32. Though not shown in the drawing, it is needless to say that the barrier panel 34 can be separately formed between two barrier substrates and then bonded onto the image panel 32 by an adhesive layer.

The barrier panel 34 has a switchable barrier for separating light incident from the image panel 32 into light of a left-eye image and light of a right-eye image. As shown in FIG. 5, the switchable barrier comprises a liquid crystal layer LC, a reference electrode CPTN positioned above the liquid crystal layer LC, and a plurality of driving electrode channels BECH positioned below the liquid crystal layer LC, each of which is controlled independently.

The reference electrode CPTN may comprise a transparent oxide material, such as indium tin oxide (ITO), indium zinc oxide (IZO), etc., or a transparent metal material, and be formed in the shape of a whole plate on a barrier substrate BGLS. A reference voltage is applied to the reference electrode CPTN. The driving electrode channels BECH may comprise a transparent oxide material, such as ITO, IZO, etc., or a transparent metal material, and be patterned in multiple layers (two or three layers) on the image panel 32. In the case that the driving electrode channels BECH are formed in two layers as shown in FIG. 5, the driving electrode channels BECH may comprise two channel groups which are patterned in a zigzag form above and below an insulating layer INS interposed therebetween. The first channel group and second channel group neighboring each other with the insulating layer INS interposed therebetween may overlap each other partially or not at all. However, it is to be noted that there should be no spacer area which may cause discilnation of the liquid crystal layer LC between the first and second channel groups even if the first channel group and the second channel group do not overlap each other. The barrier may be incomplete in the spacer area, and undesired light may be transmitted through the barrier, thereby causing 3D crosstalk.

Liquid crystals of the liquid crystal layer LC may be driven in a normally white mode in which the transmittance becomes higher as the potential difference between the reference voltage applied to the reference electrode CPTN and the driving voltage applied to the driving electrode channels BECH becomes smaller. In this case, liquid crystals formed in an area where the potential difference between the reference voltage and the driving voltage is maximum function as a barrier that blocks incident light, whereas liquid crystals formed in an area where the potential difference between the reference voltage and the driving voltage is minimum allow incident light to pass therethrough. On the other hand, liquid crystals of the liquid crystal layer LC may be driven in a normally black mode in which the transmittance becomes lower as the potential difference between the reference voltage applied to the reference electrode CPTN and the driving voltage applied to the driving electrode channels BECH becomes smaller. In this case, liquid crystals formed in an area where the potential difference between the reference voltage and the driving voltage is minimum blocks incident light, whereas liquid crystals formed in an area where the potential difference between the reference voltage and the driving voltage is maximum allow incident light to pass therethrough. The following description will be made with respect to the normally white mode for convenience of explanation. In the switchable barrier of the present invention, when the liquid crystal layer LC is driven to block light by the driving voltage applied to the driving electrode channels BECH, the corresponding area serves as a barrier area, and when the liquid crystal layer LC is driven to transmit light by the driving voltage applied to the driving electrode channels BECH, the corresponding area serves as an open area.

In the present invention, to effectively compensate for changes in viewing position made as the stereoscopic image display device is moved or the user moves, driving electrode channels BECH are formed in multiple layers, as described above, and a dynamic barrier technology, used in conjunction with a gyro sensor or an eye-tracking technology, is employed. By means of the dynamic barrier, the present invention makes it possible to find out at least either movement information of the display element or position information of both eyes of the user, and therefore changes the position of the barrier as much as desired, thereby improving the viewing angle and compensating for a decrease in resolution.

The controller 10 generates 3D (stereoscopic image) data and supplies it to the image panel 32, and controls the operation timing of the image panel by using timing control signals. The controller 10 comprises a gyro sensor 12, and senses the movement of the display element 30 and outputs motion information of the display element 30 in accordance with a sensing result. The controller 10 may further comprise eye tracking means including a web camera to output position information of the user's eyes. "ITG" shown in FIG. 4 indicates movement information of the display element or position information of both eyes of the user.

Figure 10:
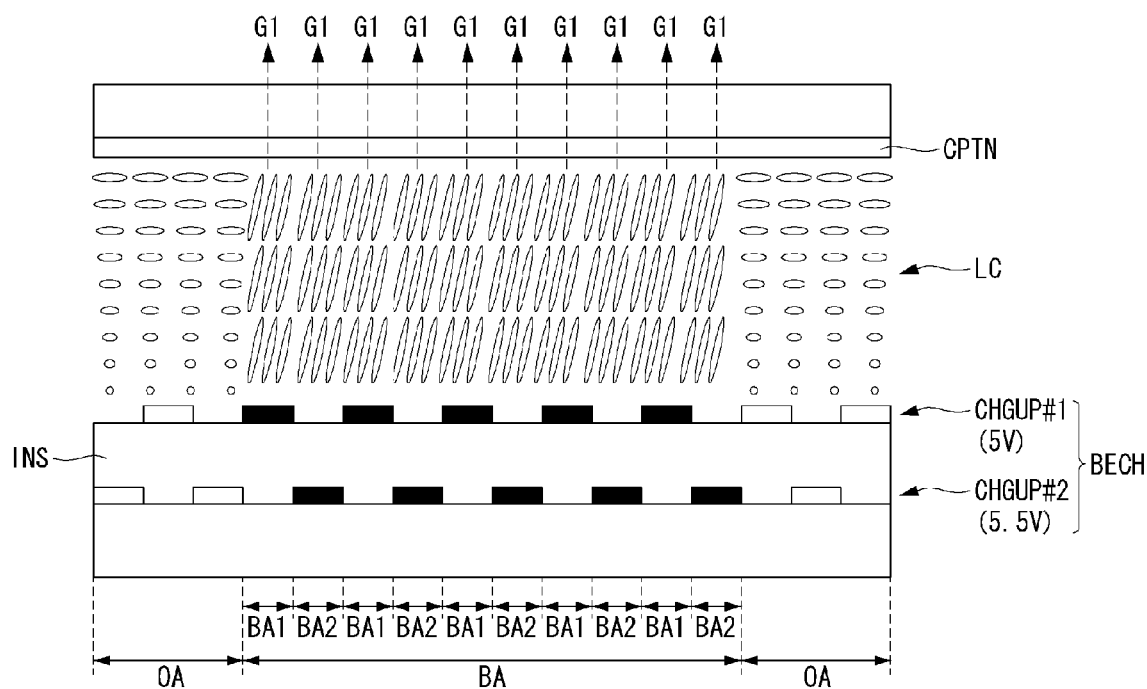
FIG. 10 shows an example in which a barrier area is configured by applying different voltages to first and second channel groups consisting of driving electrode channels formed in two layers.

The driver 20 receives 3D data from the controller 10, converts the 3D data into left-eye and right-eye data voltages LDATA and RDATA, and supplies them to data lines of the image panel 32. The driver 20 generates scan pulses in accordance with the supply timing of the left-eye and right-eye data voltages LDATA and RDATA, and supplies them to gate lines of the image panel 32. The driver 20 calculates a change in viewing position based on the display element movement information input from the controller 10, and supplies the barrier panel 34 with a channel driving voltage CV for changing the position of the barrier in accordance with the changed viewing position. Moreover, the driver 20 calculates a change in viewing position based on the position information of both eyes of the user, and supplies the driving electrode channels BECH of the barrier panel 34 with a channel driving voltage CV for changing the position of the barrier in accordance with the changed viewing position. Especially, when supplying a channel driving voltage CV to the driving electrode channels BECH formed in multiple layers, the driver 20 may vary the channel driving voltage CV for forming a barrier area according to the layers, as shown in FIG. 10, in order to suppress a difference in black luminance within the barrier area. The driver 20 generates a reference voltage and supplies it to the reference electrode CPTN of the barrier panel 34.

Figure 6:
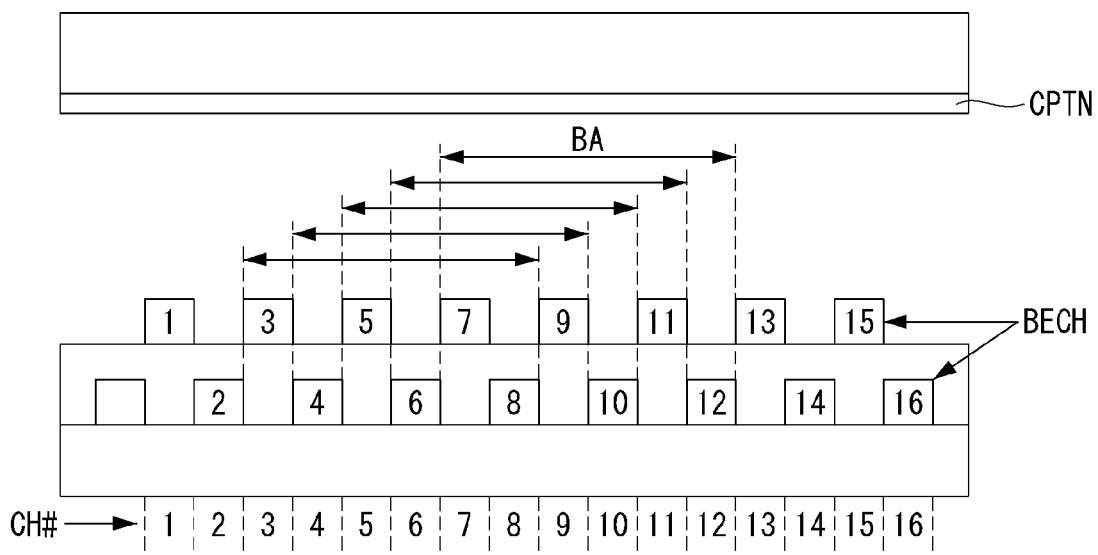
FIG. 6 shows a barrier area in the barrier panel and its corresponding driving electrode channels.
Figure 7:
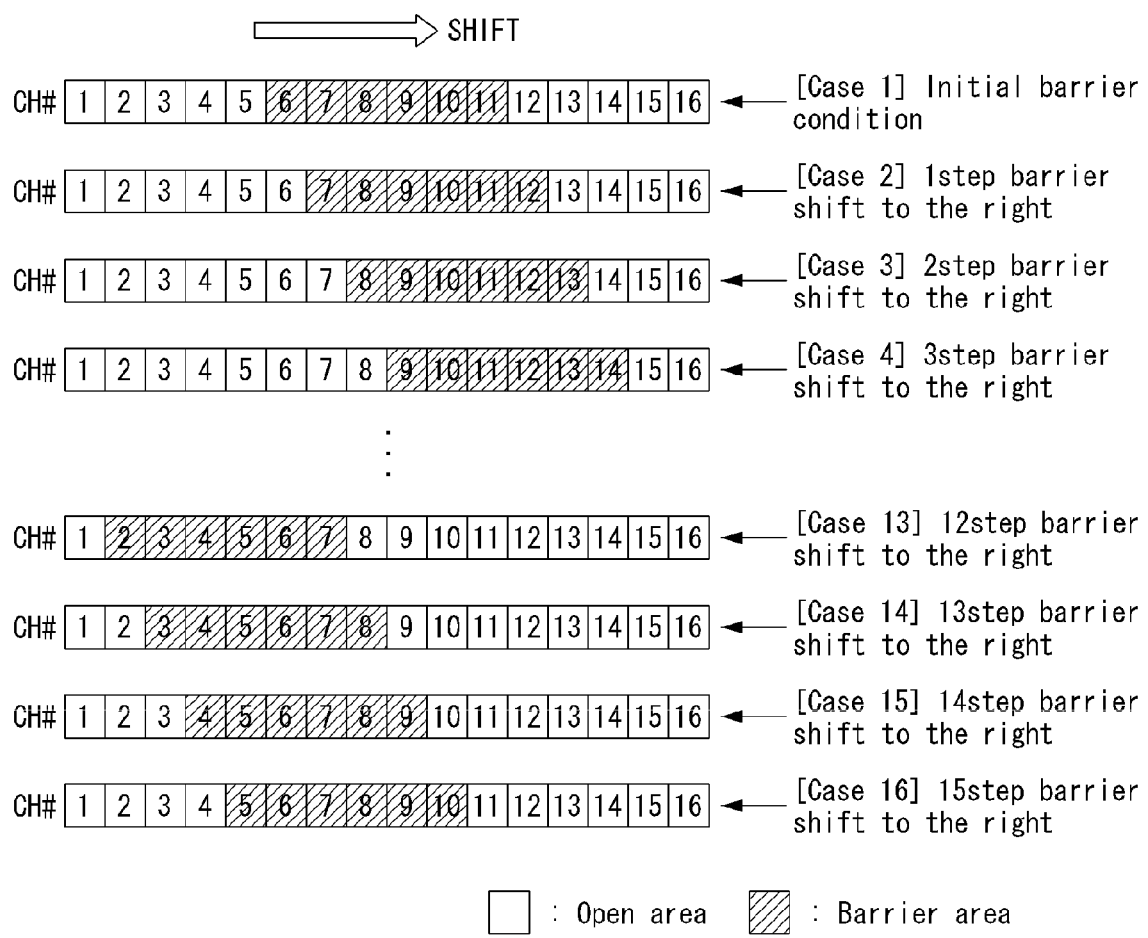
FIG. 7 shows an example in which a barrier (i.e., barrier area) is shifted to the right channel by channel in accordance with a change in viewing position.

FIG. 6 shows a barrier area BA in the barrier panel 34 and its corresponding driving electrode channels BECH. FIG. 7 shows an example in which a barrier (i.e., barrier area) is shifted to the right channel by channel in accordance with a change in viewing position.

The barrier area BA shown in FIGS. 6 and 7 can be shifted by adjusting the channel driving voltage CV in accordance with a change in viewing position. A channel driving voltage CV equal to the reference voltage may be applied to the driving electrode channels BECH corresponding to the open area, and a channel driving voltage CV different from the reference voltage may be applied to the driving electrode channels BECH corresponding to the barrier area.

In FIG. 6, five barrier areas BA sequentially shown from top to bottom correspond to case 14, case 15, case 16, case 1, and case 2 of FIG. 7, respectively, which are formed by sequentially shifting the barrier area to the right channel by channel.

Figure 8:
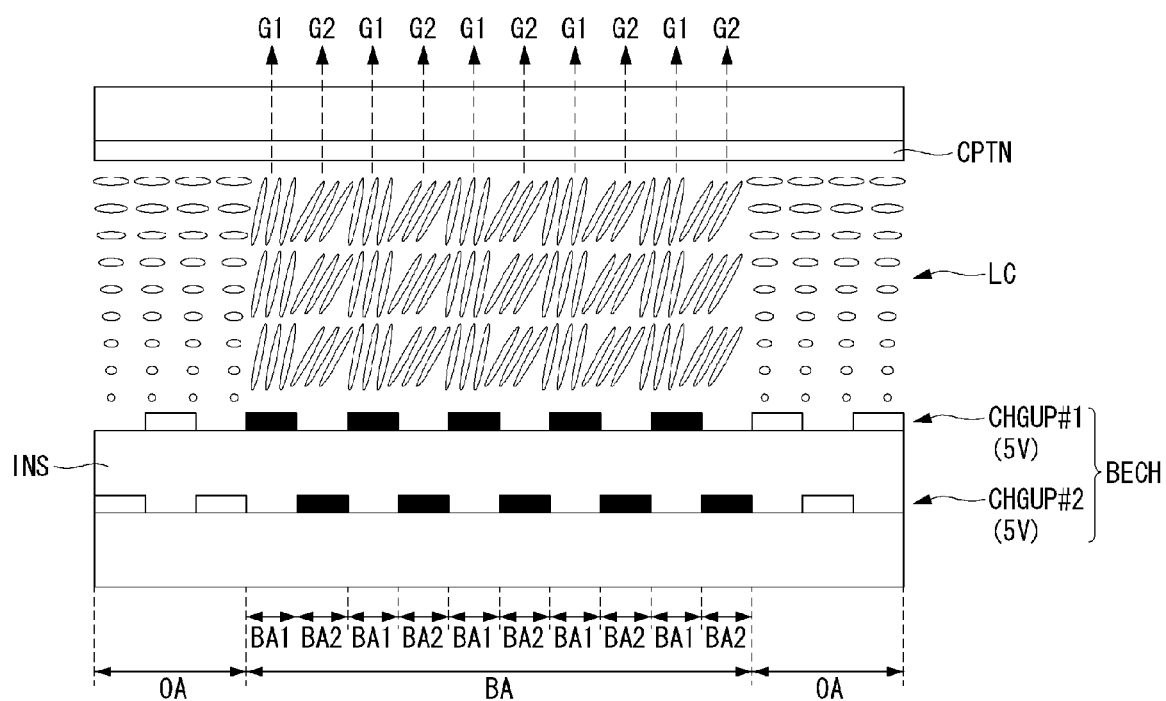
FIG. 8 shows an example in which a barrier area is configured by applying the same voltage to first and second channel groups consisting of driving electrode channels formed in two layers.
Figure 9:
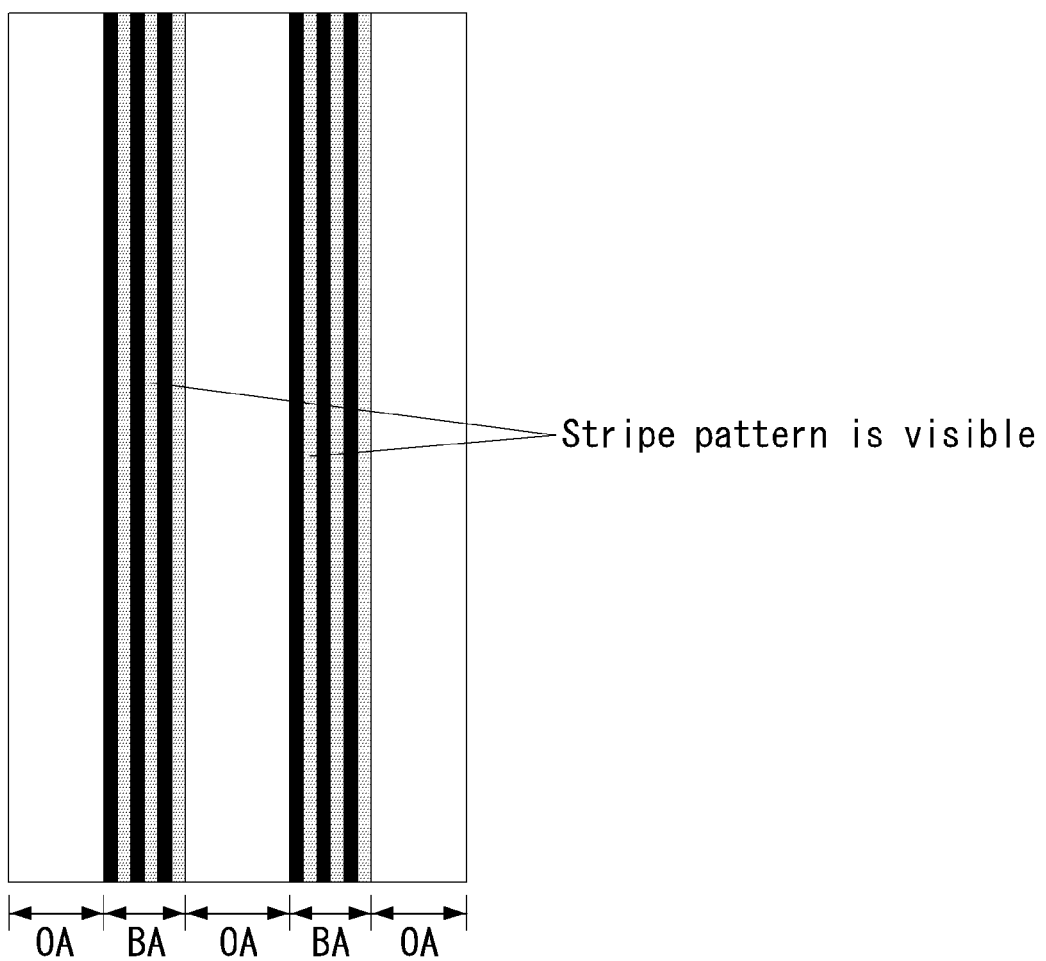
FIG. 9 shows the result of a test for displaying an image in a barrier area and an open area, based on the configuration of FIG. 8.

FIG. 8 shows an example in which a barrier area BA is configured by applying the same voltage to first and second channel groups CHGUP#1 and CHGUP#2 comprised of driving electrode channels BECH formed in two layers. FIG. 9 shows the result of a test for displaying an image in a barrier area and an open area, based on the configuration of FIG. 8.

In FIG. 8, the driving electrode channels BECH corresponding to the barrier area BA are indicated in black, and the driving electrode channels BECH corresponding to the open area OA are indicated in white. A channel driving voltage equal to the reference voltage applied to the reference electrode CPTN is applied to the driving electrode channels BECH of the first and second channel groups CHGUP#1 and CHGUP#2 corresponding to the open area OA. A channel driving voltage different from the reference voltage is applied to the driving electrode channels BECH of the first and second groups CHGUP#1 and CHGUP#2 corresponding to the barrier area BA.

In the barrier area BA, the first barrier area BA1 and the second barrier area BA2 alternate with each other. The first barrier area BA1 indicates an area which is driven by an electric field between the first channel group CHGUP#1 and the reference electrode CPTN, and the second barrier area BA2 indicates an area which is driven by an electric field between the second channel group CHGUP#2 and the reference electrode CPTN.

If the reference voltage is 0 V, a channel driving voltage of 5V may be applied to the first and second channel groups CHGUP#1 and CHGUP#2 corresponding to the barrier area BA. In this case, the electric field applied to the second barrier area BA2 is smaller than that applied to the first barrier area BA1 due to the effect of the insulating layer INS positioned between the first and second channel groups CHGUP#1 and CHGUP#2. Accordingly, the black luminance G2 achieved in the second barrier area BA2 is higher than the black luminance G1 achieved in the first barrier area BA1. In the respective barrier areas BA, the luminance difference between the first and second barrier areas BA1 and BA2 may be perceived as a stripe pattern, as shown in FIG. 9. This stripe pattern deteriorates the display quality of a stereoscopic image, and may cause 3D crosstalk especially in the second barrier area BA2 having higher black luminance G2.

Figure 11:
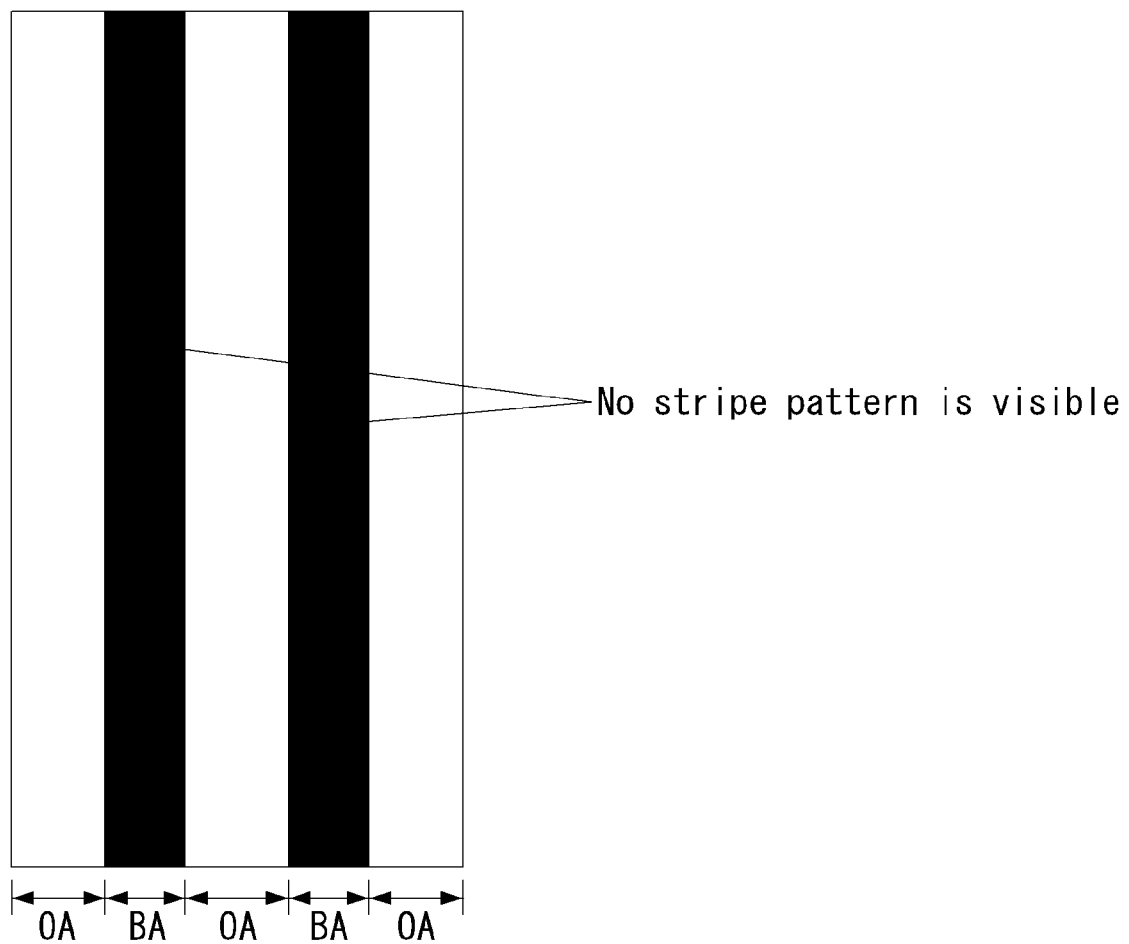
FIG. 11 shows the result of a test for displaying an image in a barrier area and an open area, based on the configuration of FIG. 10.

FIG. 10 shows an example in which a barrier area BA is configured by applying different voltages to first and second channel groups CHGUP#1 and CHGUP#2 comprised of driving electrode channels BECH formed in two layers. FIG. 11 shows the result of a test for displaying an image in the barrier area and the open area, based on the configuration of FIG. 10.

In FIG. 10, the driving electrode channels BECH corresponding to the barrier area BA are indicated in black, and the driving electrode channels BECH corresponding to the open area OA are indicated in white. A channel driving voltage equal to the reference voltage applied to the reference electrode CPTN is applied to the driving electrode channels BECH of the first and second channel groups CHGUP#1 and CHGUP#2. A channel driving voltage different from the reference voltage is applied to the driving electrode channels BECH of the first and second groups CHGUP#1 and CHGUP#2 corresponding to the barrier area BA; especially, this channel driving voltage differs depending upon the channel groups.

In the barrier area BA, the first barrier area BA1 and the second barrier area BA2 alternate with each other. The first barrier area BA1 indicates an area which is driven by an electric field between the first channel group CHGUP#1 and the reference electrode CPTN, and the second barrier area BA2 indicates an area which is driven by an electric field between the second channel group CHGUP#2 and the reference electrode CPTN.

If the reference voltage is OV, a channel driving voltage of 5V may be applied to the first channel group CHGUP#1, and a channel driving voltage of 5.5V may be applied to the second channel group CHGUP#2. This is to eliminate an electric field difference between the first and second barrier areas BA1 and BA2 in the barrier area BA. As a result, the black luminance achieved in the second barrier area BA2 becomes G1, which is equal to the black luminance achieved in the first barrier area BA1.

By thusly applying difference channel driving voltages to the first and second channel groups CHGUP#1 and CHGUP#2 corresponding to the barrier area BA, the luminance difference between the first and second barrier areas BA1 and BA2 is eliminated in the barrier area BA, as shown in FIG. 11, and as a result, no stripe pattern appears.

Figure 12:
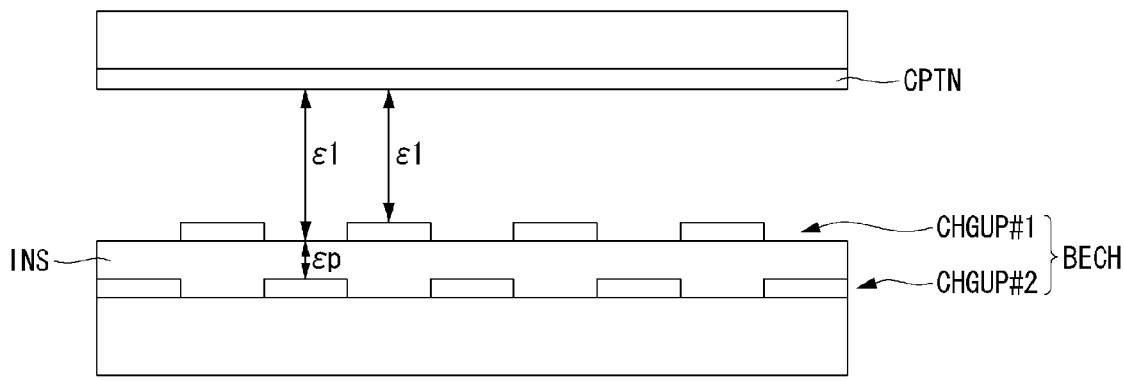
FIG. 12 shows the effective dielectric constant of the region between the reference electrode and the driving electrode channels.
Figure 13:
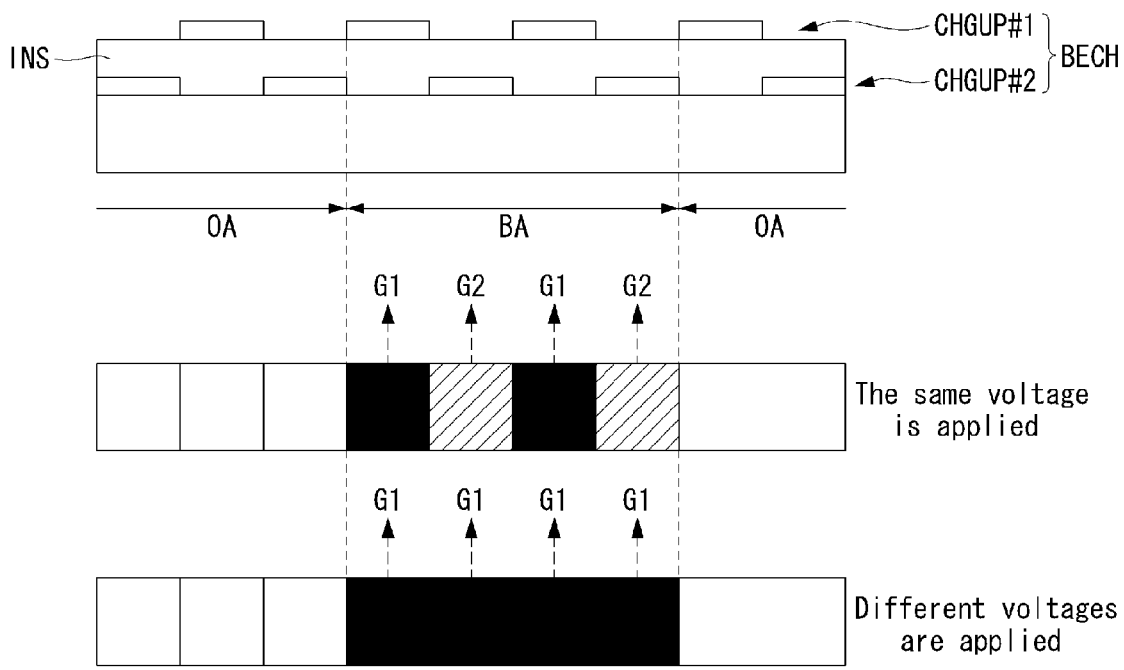
FIG. 13 comparatively shows the black luminance obtained when the same channel driving voltage is applied to the first and second channel groups in a barrier area and the black luminance obtained when different channel driving voltages are applied thereto.

FIG. 12 shows the effective dielectric constant of the region between the reference electrode CPTN and the driving electrode channels BECH. FIG. 13 comparatively shows the black luminance obtained when the same channel driving voltage is applied to the first and second channel groups CHGUP#1 and CHGUP#2 in the barrier areas BA and the black luminance obtained when different channel driving voltages are applied thereto.

Referring to FIG. 12, a description will be made on the effective dielectric constant which varies depending on the positions of the driving electrode channels BECH. An effective dielectric constant "∈1" is provided to the region between the reference electrode CPTN and the first channel group CHGUP#1 because the liquid crystal layer LC exists therebetween, and an effective dielectric constant "∈1+∈p" is provided to the region between the reference electrode CPTN and the first channel group CHGUP#2 because the insulating layer INS, as well as the liquid crystal layer LC, exists therebetween.

As shown in FIG. 13, if the same channel driving voltage is applied to the first and second channel groups CHGUP#1 and CHGUP#2 corresponding to the barrier area BA despite that the effective dielectric constant differs depending on the positions of the driving electrode channels BECH, black luminance differences G1 and G2 appear. In the present invention, to eliminate these black luminance differences, as explained above, the first channel driving voltage (e.g., 5V) is applied to the first channel group CHGUP#1 corresponding to the barrier area (i.e., BA1 of FIG. 10) having the first dielectric constant ∈1, among the barrier areas BA, and the second channel driving voltage (e.g., 5.5V) is applied to the second channel group CHGUP#2 corresponding to the barrier area (i.e., BA2 of FIG. 10) having the second dielectric constant ∈1+∈p, among the barrier areas BA. That is, a barrier area formation voltage applied to the driving electrode channels BECH of an area having a higher dielectric constant is set to be higher than a barrier area formation voltage applied to the driving electrode channels BECH of an area having a lower dielectric constant.

Although the exemplary embodiment of the present invention is described taking the driving electrode channels BECH formed in two layers as an example, the technical concept of the present invention is not limited thereto. The technical concept of the present invention can be extended to three or more multiple layers. Moreover, the present invention is applicable to the normally black mode, as well as the normally white mode. The technical gist of the present invention will be generalized to cover all these conditions. In the present invention, when the driving electrode channels BECH comprise the first channel group of the first layer spaced a first distance apart from the reference electrode and the second channel group of the second layer spaced a second distance apart from the reference electrode, the channel driving voltage for forming the barrier area differs for the first channel group and the second channel group, respectively. In the present invention, the channel driving voltage for forming the barrier area can be set higher for the second channel group than for the first channel group in the normally white mode, and on the contrary, the channel driving voltage for forming the barrier area can be set higher for the first channel group than for the second channel group in the normally black mode.

Figure 14:
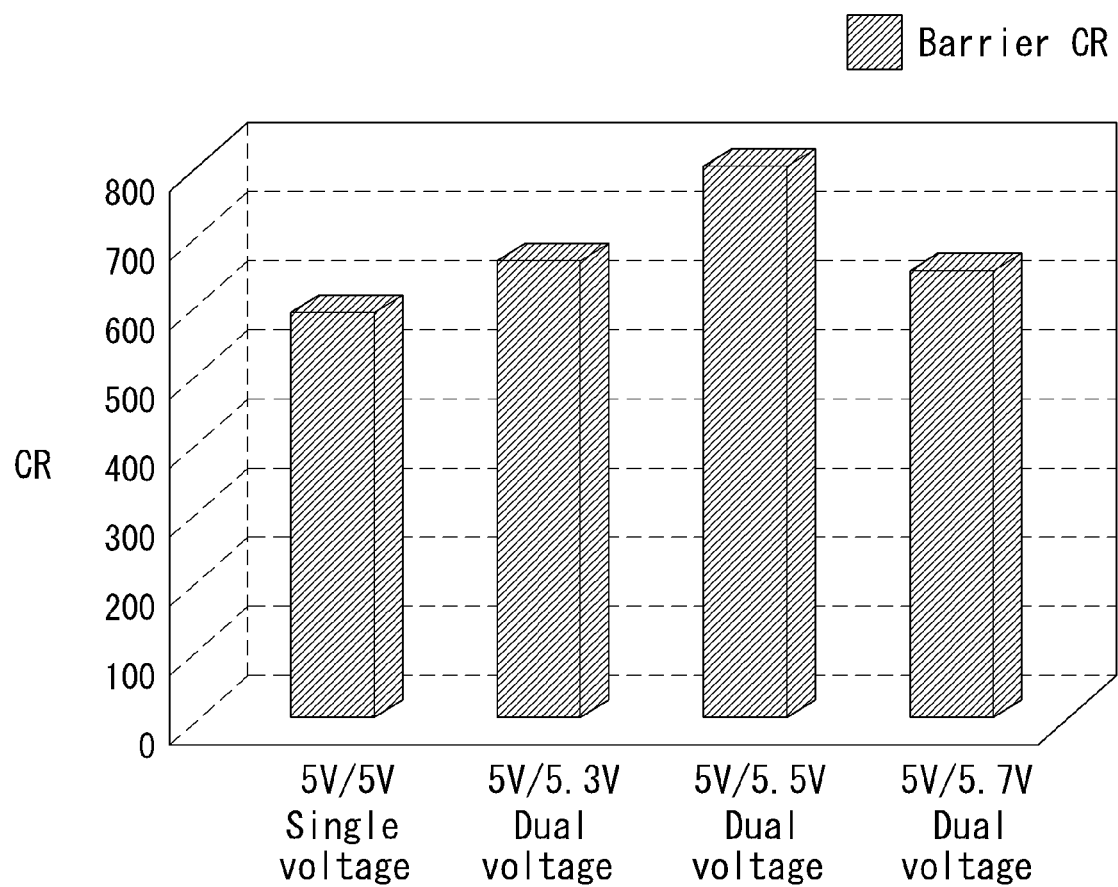
FIG. 14 shows the contrast ratio of the barrier formed when the same channel driving voltage is applied to the first and second channel groups and the barrier formed when different channel driving voltages are applied to the first and second channel groups.
Figure 15:
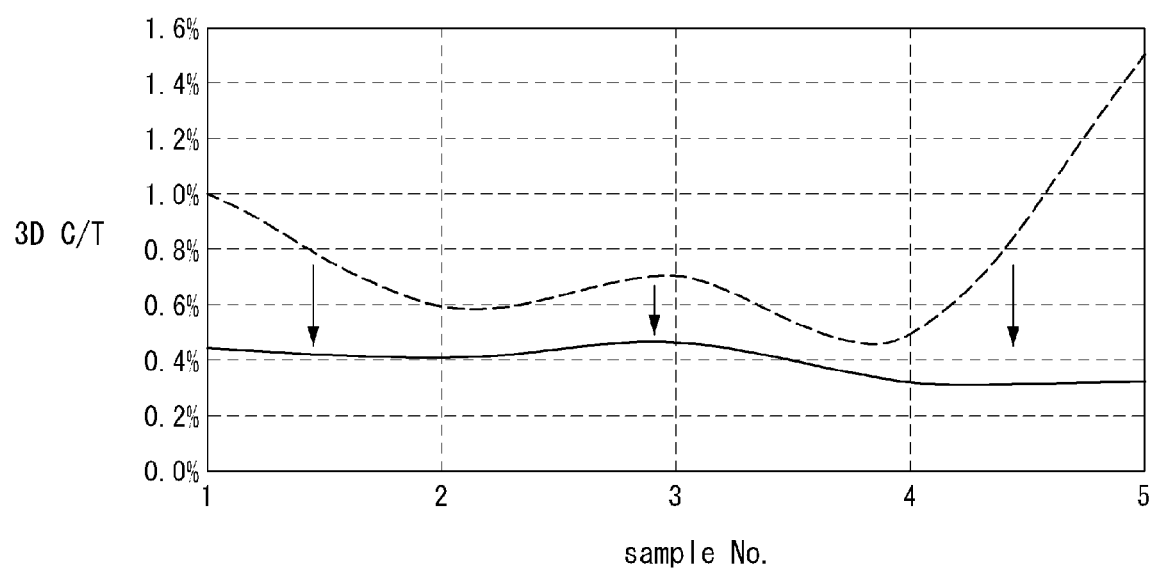
FIG. 15 shows the measured values of 3D crosstalk for different samples before and after different channel driving voltages are applied to the first and second channel groups.

FIG. 14 shows the contrast ratio (CR) of the barrier obtained when the same channel driving voltage is applied to the first and second channel groups and the barrier formed when different channel driving voltages are applied to the first and second channel groups. FIG. 15 shows the measured values of 3D crosstalk for different samples before and after different channel driving voltages are applied to the first and second channel groups.

Referring to FIG. 14, it is observed that the contrast ratio of the barrier (barrier area) is higher when different channel driving voltages are applied to the first and second channel groups (dual voltage application), as compared to when the same channel driving voltage is applied to the first and second channel groups (single voltage application). A higher contrast ratio in the barrier area involves a lower black luminance difference in the barrier area.

Referring to FIG. 15, it is observed that the measured values of 3D crosstalk for different samples are much lower after different channel driving voltages are applied to the first and second channel groups (indicated by the dotted line of FIG. 15), as compared to before different channel driving voltages are applied to the first and second channel groups (indicated by the solid line of FIG. 15). The reason for the reduction in 3D crosstalk is because the black luminance, which is higher in the barrier area, is adjusted to lower black luminance.

Figure 16:
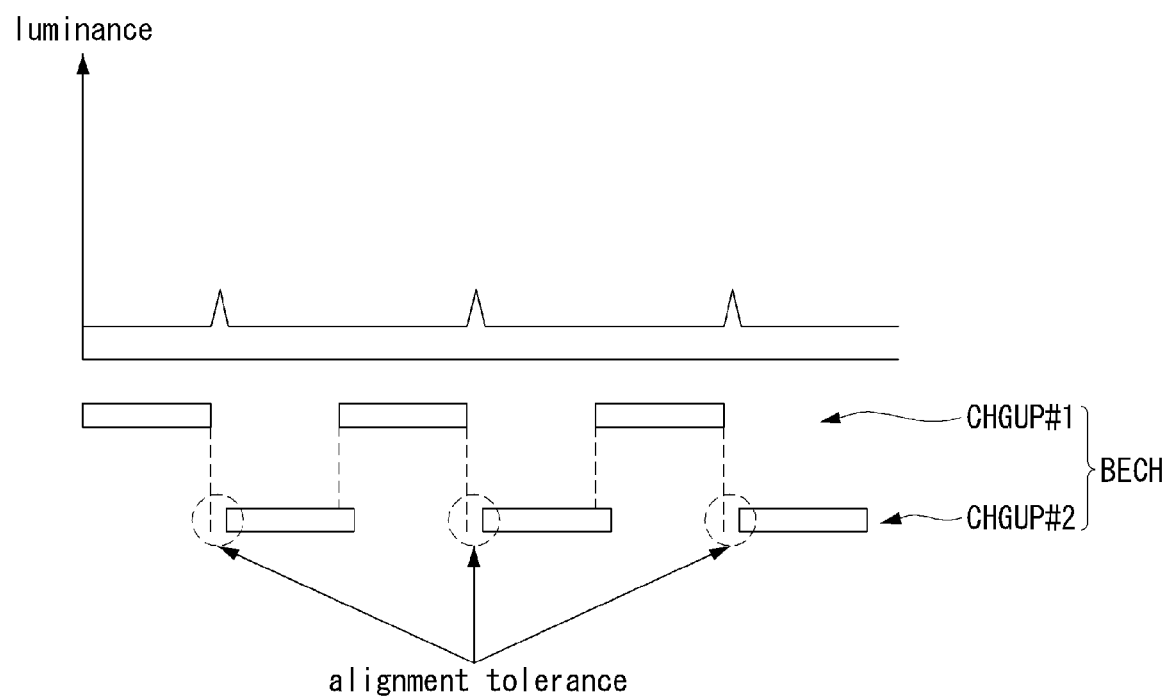
FIG. 16 shows a method for compensating for a black luminance difference caused by an alignment tolerance between the first channel group and the second channel group.

FIG. 16 shows a method for compensating for a black luminance difference caused by an alignment tolerance between the first channel group CHGUP#1 and the second channel group CHGUP#2.

Referring to FIG. 16, an alignment tolerance may be induced when the first channel group CHGUP#1 and the second channel group CHGUP#2 are formed. In this case, a spacer which may cause a disclination of the liquid crystal layer may be formed between the first channel group CHGUP#1 and the second channel group CHGUP#2. If the spacer formed due to the alignment tolerance is positioned in the barrier area, undesired light may leak out through the spacer, thereby increasing the black luminance partly in the barrier area corresponding to the spacer. Such an adverse effect is very serious when the same channel driving voltage is applied to the first and second channel groups CHGUP#1 and CHGUP#2. However, this adverse effect can be reduced to an ignorable level when the black luminance in the barrier area is wholly reduced to the lowest level by applying different channel driving voltages to the first and second channel groups.

Figure 17:
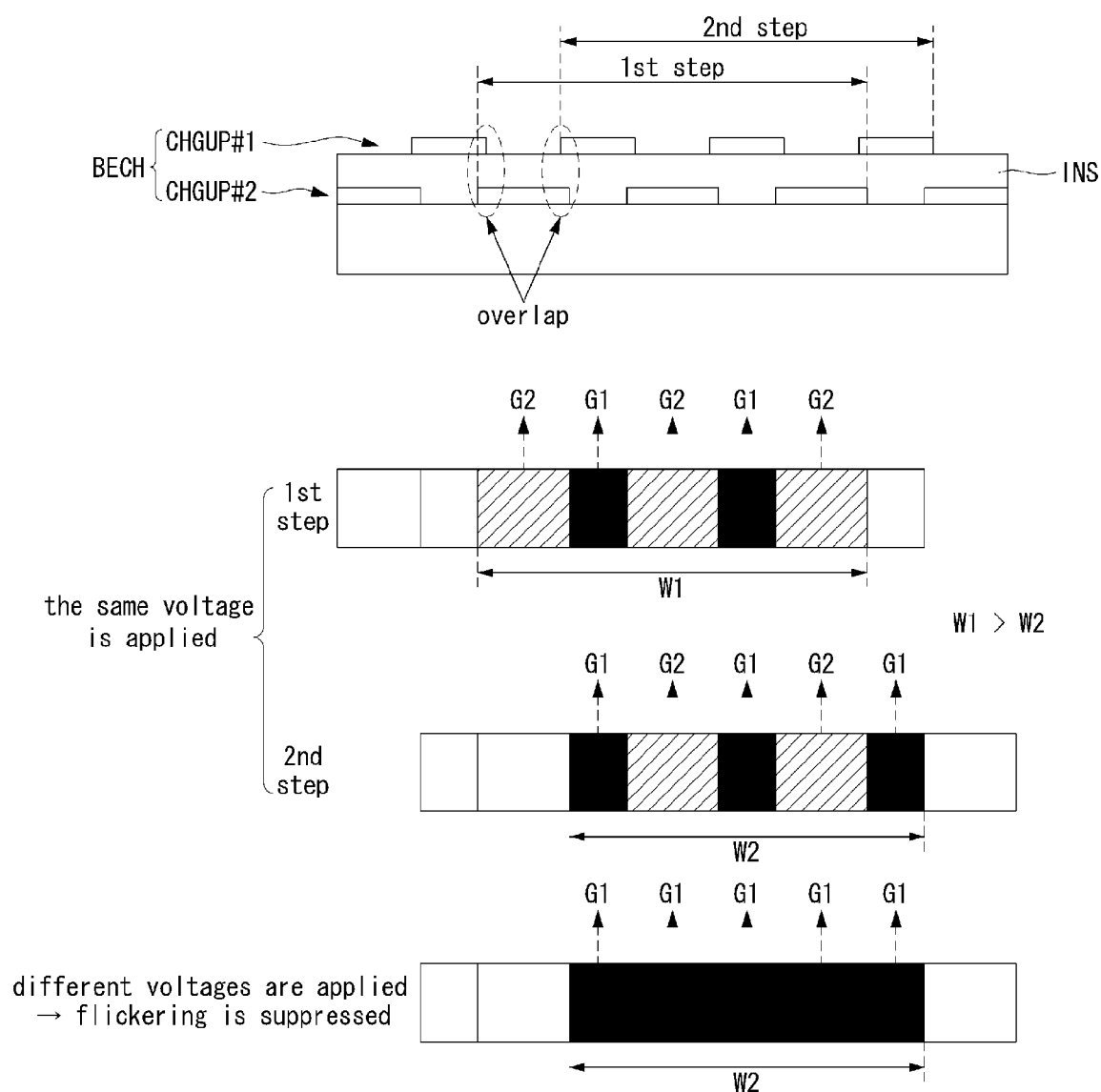
FIG. 17 shows a method for compensating for a barrier width difference between steps when the first channel group and the second channel group are formed to overlap each other.

FIG. 17 shows a method for compensating for a barrier width difference between steps when the first channel group CHGUP#1 and the second channel group CHGUP#2 are formed to overlap each other, by taking into consideration an etch bias difference between the multiple layers comprising the driving electrode channels.

Referring to FIG. 17, in the present invention, the electrode width of each of the channels of the second channel group CHGUP#2 may be set to be wider than the electrode width of each of the channels of the first channel group CHGUP#1. Accordingly, the horizontal distance between the channels of the second channel group CHGUP#2 is less than the horizontal distance between the channels of the first channel group CHGUP#1. If the width of the barrier area is set to correspond to the width of five channels and the barrier area is shifted to the right channel by channel to realize a dynamic barrier, the first width W1 of the barrier area obtained at the first step and the second width W2 of the barrier area obtained at the second step are different. The first width W1 of the barrier area is greater than the second width W2 of the barrier area. In the barrier area, the first width W1 and the second width W2 alternate with each other as the steps progress.

In this state, when the same driving voltage is applied to the first and second channel groups CHGUP#1 and CHGUP#2, flickering is clearly visible due to a difference in the brightness of the barrier area, which is induced by the alternation of the first and second widths W1 and W2. This is because, when the same channel driving voltage is applied to the first and second channel groups CHGUP#1 and CHGUP#2, channels (channels with G2) whose black luminance is partially high are included in the barrier area. The barrier area having the first width W1 exhibits higher black luminance because there are three channels with G2, and the barrier area having the second width W2 exhibit lower black luminance because there are two channels with G2.

However, if difference driving voltages are applied to the first and second channel groups CHGUP#1 and CHGUP#2 according to the present invention, the flickering which occurs due to the brightness difference by the alternation of the first width W1 and the second width W2 is greatly suppressed. By wholly reducing the black luminance in the barrier area to the lowest level by means of variations in the channel driving voltage, the brightness difference in the barrier area is reduced to an ignorable level even if the widths W1 and W2 of the barrier area alternate with each other as the steps progress.

As seen from above, the parallax barrier type stereoscopic image display device according to the present invention can achieve an improvement in display quality and reduce visual fatigue greatly since a luminance difference in the barrier is compensated for by varying the channel driving voltage applied to the driving electrode channels according to layers, when employing a dynamic barrier technology based on multi-channels comprising driving electrode channels formed in multiple layers.

Throughout the description, it should be understood for those skilled in the art that various changes and modifications are possible without departing from the technical principles of the present invention. Therefore, the technical scope of the present invention is not limited to those detailed descriptions in this document but should be defined by the scope of the appended claims.

What is claimed is:

1. A parallax barrier type stereoscopic image display device comprising:
an image panel that displays a left-eye image and a right-eye image;
a barrier panel that has a switchable barrier comprising a liquid crystal layer, a reference electrode positioned above the liquid crystal layer, and a plurality of driving electrode channels positioned below the liquid crystal layer, each of which is controlled independently, and selectively blocks light from the image panel; and
a driver that supplies a reference voltage to the reference electrode and applies a channel driving voltage to the driving electrode channels to form a plurality of barrier areas and a plurality of open areas in the switchable barrier,
the driving electrode channels comprising a first channel group of a first layer spaced a first distance apart from the reference electrode and a second channel group of a second layer spaced a second distance apart from the reference electrode, the second distance being greater than the first distance, wherein each of the plurality of barrier areas comprises a plurality of first sub-barrier areas formed by a first channel driving voltage applied to the first channel group of the first layer and a plurality of second sub-barrier areas formed by a second channel driving voltage applied to the second channel group of the second layer, wherein the first channel driving voltage and the second channel driving voltage are different, such that the plurality of first sub-barrier areas and the plurality of second sub-barrier areas within the plurality of barrier areas achieve an equal black luminance eliminating an electric field difference between the plurality of first sub-barrier areas and the plurality of second sub-barrier areas, wherein the second channel driving voltage is higher than the first channel driving voltage in a normally white mode, and the first channel driving voltage is higher than the second channel driving voltage in a normally black mode, and wherein each of the first channel driving voltage and the second channel driving voltage is higher than the reference voltage.

2. The parallax barrier type stereoscopic image display device of claim 1, wherein an insulating layer is formed between the first channel group of the first layer and the second channel group of the second layer.

3. The parallax barrier type stereoscopic image display device of claim 1, wherein the electrode width of each of the channels of the second channel group is wider than the electrode width of each of the channels of the first channel group.

4. The parallax barrier type stereoscopic image display device of claim 1, further comprising a controller that senses and outputs at least either movement information of a display element comprising the image panel and the barrier panel or position information of both eyes of a user, wherein the driver calculates a change in viewing position based on at least either the movement information of the display element or the position information of both eyes of the user, and sets the first channel driving voltage and the second channel driving voltage to be different from each other so that the plurality of first sub-barrier areas and the plurality of second sub-barrier areas in the switchable barrier are determined in accordance with the changed viewing position.

* * * * *